(12) United States Patent
Chan et al.

(10) Patent No.: US 11,029,727 B1
(45) Date of Patent: Jun. 8, 2021

(54) CASE FOR PORTABLE ELECTRONIC COMPUTING DEVICE

(71) Applicant: Pioneer Square Brands, Inc., Seattle, WA (US)

(72) Inventors: Jaimie Emerald Chan, Renton, WA (US); Michael Cooper Ferren, Camas, WA (US); Megan Elizabeth Zumel Manzano, Seattle, WA (US); Brian Lewis Piper, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/075,728

(22) Filed: Oct. 21, 2020

Related U.S. Application Data

(62) Division of application No. 16/701,132, filed on Dec. 2, 2019, now Pat. No. 10,845,844.

(51) Int. Cl.
*G06F 1/16* (2006.01)

(52) U.S. Cl.
CPC .......... *G06F 1/1628* (2013.01); *G06F 1/1616* (2013.01); *G06F 1/1637* (2013.01); *G06F 1/1662* (2013.01)

(58) Field of Classification Search
CPC .... G06F 1/1628; G06F 1/1616; G06F 1/1637; G06F 1/1662
USPC ........ 206/320, 45.2, 45.23, 45.24, 472, 473, 206/745, 747, 748; 281/37, 38, 39
See application file for complete search history.

(56) References Cited

U.S. PATENT DOCUMENTS

| | | | | |
|---|---|---|---|---|
| 3,074,744 A * | 1/1963 | Pucci | ................... | B42F 13/002 281/37 |
| 5,116,081 A * | 5/1992 | Mann, Jr. | ............ | B42F 13/0006 281/36 |
| 5,338,125 A * | 8/1994 | Forsse | ................... | B42F 13/34 206/472 |
| 5,709,494 A * | 1/1998 | Deutsch | ................. | B42F 13/12 281/36 |
| 6,179,508 B1 * | 1/2001 | Coerver | ................. | B42F 13/26 281/17 |
| 6,286,667 B1 * | 9/2001 | Lee | ......................... | G06F 15/02 206/305 |
| 6,571,948 B2 * | 6/2003 | Jones | ................. | E05B 73/0082 206/1.5 |
| 7,191,926 B1 * | 3/2007 | Costantino | ............... | A45C 3/02 190/102 |
| 9,225,814 B2 * | 12/2015 | Nyholm | ................ | G06F 1/1628 |
| 10,838,455 B2 * | 11/2020 | Fenton | ................. | G06F 1/1616 |

(Continued)

*Primary Examiner* — Jacob K Ackun
(74) *Attorney, Agent, or Firm* — Grandview Law

(57) ABSTRACT

Systems and methods are involved with but are not limited to an apparatus including a keyboard case structure including side portions with walls extending therefrom, and being sized and shaped to detachably engage with a keyboard assembly; a display case structure including side portions with walls extending therefrom, and being sized and shaped to detachably engage with a display assembly; and a hinge case structure including one or more first engagement edges being sized and shaped to detachably engage with the keyboard case structure, and one or more second engagement edges being sized and shaped to detachably engage with the display case structure. In addition, other aspects are described in the claims, drawings, and text forming a part of the present disclosure.

20 Claims, 16 Drawing Sheets

(56) References Cited

U.S. PATENT DOCUMENTS

| | | | | |
|---|---|---|---|---|
| 10,845,844 | B1* | 11/2020 | Chan | G06F 1/1628 |
| 10,928,854 | B1* | 2/2021 | Fenton | G06F 1/1628 |
| 2003/0217940 | A1* | 11/2003 | Russell | G06F 1/1628 |
| | | | | 206/320 |
| 2005/0072699 | A1* | 4/2005 | Ng | B60R 11/0235 |
| | | | | 206/320 |
| 2005/0200608 | A1* | 9/2005 | Ulla | G06F 1/1626 |
| | | | | 345/168 |
| 2006/0060485 | A1* | 3/2006 | Picot | A45C 5/00 |
| | | | | 206/320 |
| 2008/0128231 | A1* | 6/2008 | Newman | A45C 7/0045 |
| | | | | 190/108 |
| 2009/0032421 | A1* | 2/2009 | Sween | A45C 5/03 |
| | | | | 206/320 |
| 2010/0181752 | A1* | 7/2010 | Venditti | B42B 5/12 |
| | | | | 281/34 |
| 2010/0258463 | A1* | 10/2010 | Yang | A45C 11/00 |
| | | | | 206/320 |
| 2010/0276316 | A1* | 11/2010 | Hu | A45C 13/005 |
| | | | | 206/320 |
| 2011/0162987 | A1* | 7/2011 | Bekele | G06F 1/16 |
| | | | | 206/320 |
| 2015/0192955 | A1* | 7/2015 | Fathollahi | G06F 1/1643 |
| | | | | 361/679.09 |
| 2019/0227592 | A1* | 7/2019 | Fenton | A45C 5/02 |

* cited by examiner

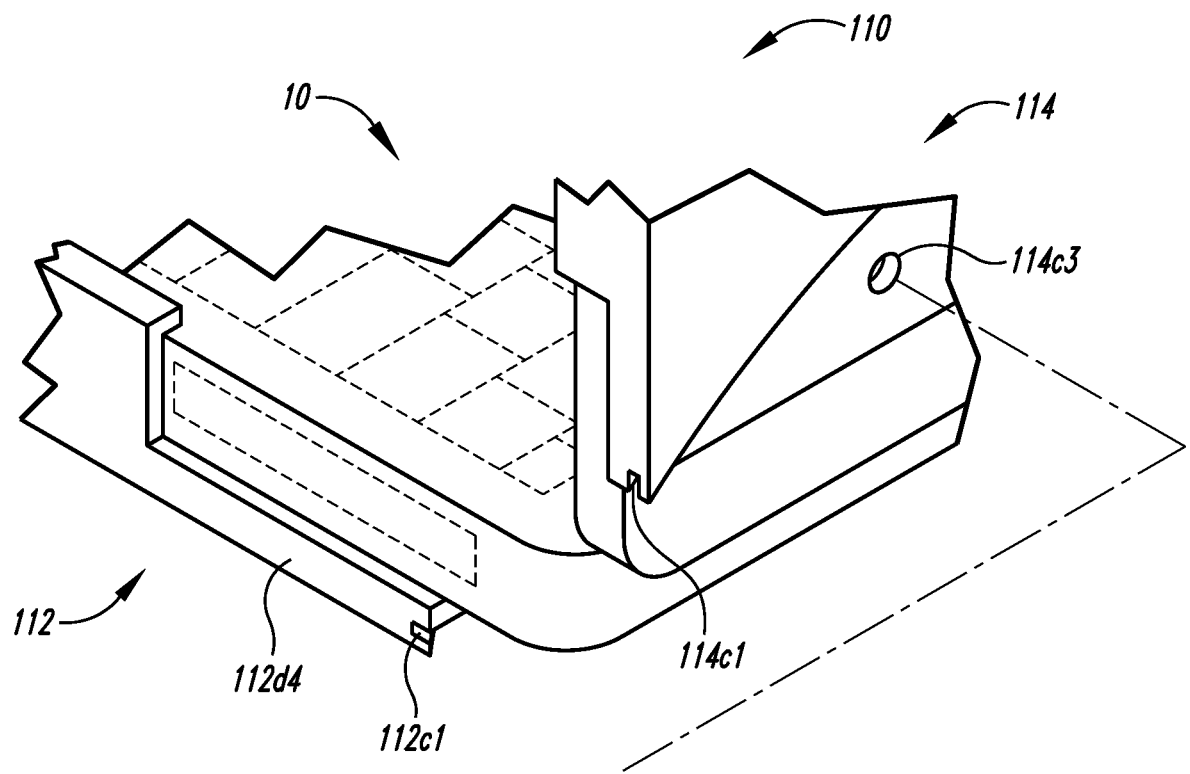
Fig. 12
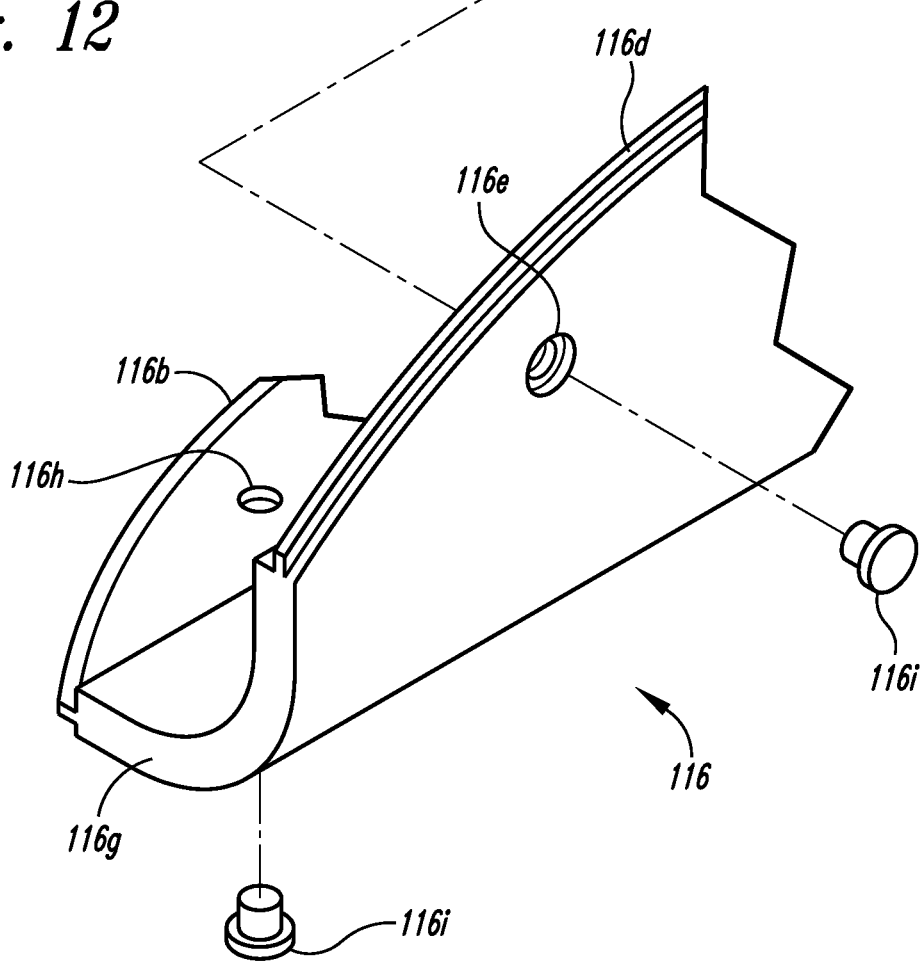

CASE FOR PORTABLE ELECTRONIC COMPUTING DEVICE

SUMMARY

In one or more aspects, an apparatus includes, but is not limited to a case for an electronic laptop computing device having a display assembly and a keyboard assembly, the case including a keyboard case structure including first, second, and fourth side portions with one or more walls extending therefrom, and a third side portion, the one or more walls being sized and shaped to detachably engage with the keyboard assembly; a display case structure including first, second, and fourth side portions with one or more walls extending therefrom, and a third side portion, the one or more walls being sized and shaped to detachably engage with the display assembly; and a hinge case structure including one or more first engagement edges being sized and shaped to detachably engage with the third side portion of the keyboard case structure, and one or more second engagement edges being sized and shaped to detachably engage with the third side portion of the display case structure.

In one or more aspects, an apparatus includes, but is not limited to a case for an electronic laptop computing device having a display assembly and a keyboard assembly, the case including a keyboard case structure including a baseplate portion including a recessed area and one or more apertures, first, second, and fourth side portions with one or more walls extending therefrom, and a third side portion, the one or more walls being sized and shaped to detachably engage with the keyboard assembly; a display case structure including a baseplate portion including a recessed area and one or more apertures, first, second, and fourth side portions with one or more walls extending therefrom, and a third side portion, the one or more walls being sized and shaped to detachably engage with the display assembly; and a hinge case structure including a panel-like portion, a first engagement flap extending from the panel-like portion, the first engagement flap being sized and shaped to engage with the recessed area of the baseplate portion of the keyboard case structure, a second engagement flap including one or more apertures, the second engagement flap extending from the panel-like portion, the second engagement flap being sized and shaped to engage with the recessed area of the baseplate portion of the display case structure, the panel-like portion sized and shaped to allow the first engagement flap to engage with the recessed area of the baseplate portion of the keyboard case structure as the second engagement flap is engaged with the recessed area of the baseplate portion of the display case structure.

In one or more aspects, an apparatus includes, but is not limited to a case for an electronic laptop computing device having a display assembly and a keyboard assembly, the case including a keyboard case structure including one or more side portions with one or more walls extending therefrom, and the one or more walls sized and shaped to detachably engage with the keyboard assembly; a display case structure including one or more side portions with one or more walls extending therefrom, and the one or more walls sized and shaped to detachably engage with the display assembly; and a hinge case portion including an engagement portion, the engagement portion being sized and shaped to detachably engage with a selected case structure, the selected case structure being selected from one of the following: the keyboard case structure and the display case structure, the hinge case portion being structurally integral with the keyboard case structure if the display case structure is the selected case structure, and the hinge case portion being structurally integral with the display case structure if the keyboard case structure is the selected case structure.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of case for portable electronic computing case based articles of manufacture, compositions of matter, systems for producing and/or methods for producing same that may provide context, for instance, in introducing one or more processes and/or devices described herein.

FIG. 12 is a rear perspective sectional view of the second computer laptop case implementation of FIG. 10 partially engaged with the conventional computer laptop.

DETAILED DESCRIPTION

Figure 1:
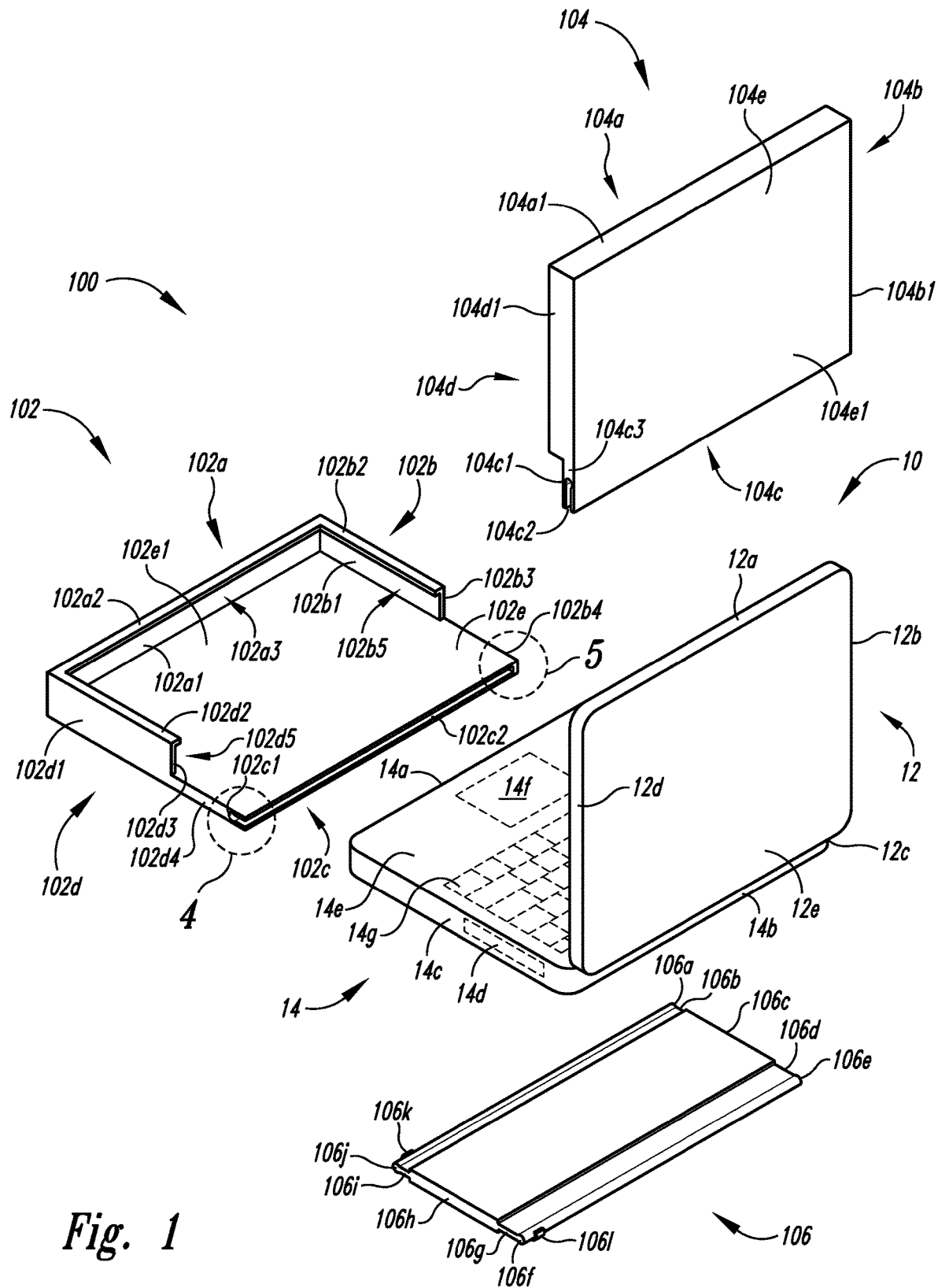
FIG. 1 is a rear perspective exploded view of a first computer laptop case implementation along with a conventional computer laptop.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Portable electronic devices, such as laptop-shaped electronic computing devices having stands integrated therein, along with their conventional cases, can pose challenges in ease of use for containment by such cases.

Turning to FIG. 1, shown in rear exploded perspective view is conventional laptop 10 having display assembly 12 and keyboard assembly 14 positioned to be received by case assembly 100 for engagement therewith. As depicted, conventional laptop 10 includes display assembly 12 and keyboard assembly 14 in which display assembly 12 includes top side portion (first side portion) 12a, left bevel portion (second side portion) 12b, bottom side portion (third side portion) 12c, right bevel portion (fourth side portion) 12d, display back 12e, and rear side portion (fifth side portion) 12f (see FIG. 8). Further depicted in FIG. 1, keyboard assembly 14 includes front side portion (first side portion) 14a, rear side portion (second side portion) 14b, right side portion (third side portion) 14c, media slot 14d, upper surface 14e, touchpad 14f, keyboard 14g, and hinge 16 (see FIG. 8).

Comprising three sections, case assembly 100 includes keyboard case structure 102, display case structure 104, and hinge case structure 106. The keyboard case structure 102 includes front side portion (first side portion) 102a with front wall portion 102a1 and front ledge portion 102a2 forming front channel portion 102a3; left side portion (second side portion) 102b with left wall portion 102b1, left ledge portion 102b2, and left end portion 102b3 forming left channel 102b5 and also with baseplate-portion left side 102b4; rear side portion (third side portion) 102c with groove 102c1 and channel 102c2; right side portion (fourth side portion) 102d with right wall 102d1, right ledge 102d2, and right end 102d3 forming right channel 102d5 and also with baseplate-portion right side 102d4; and baseplate portion 102e with baseplate portion interior surface 102e1. The keyboard case structure 102 can be a single molded piece from a type of plastic or other moldable material or can be constructed from individual pieces such as for each of front side portion (first side portion) 102a, left side portion (second side portion) 102b, rear side portion (third side portion) 102c, right side portion (fourth side portion) 102d, and baseplate portion 102e. The front channel portion 102a3, left channel 102b5, and right channel 102d5 are sized and shaped to receive front side portion (first side portion) 14a, left side portion (not shown), and right side portion (third side portion) 14c, respectfully, of keyboard assembly 14 of conventional laptop 10 with some versions having a substantially snug fit so that one or more surfaces of keyboard case structure 102 are substantially in contact with one or more surfaces of keyboard assembly 14 without interfering with upper surface 14e including touchpad 14f and keyboard 14g as keyboard assembly 14 is being contained by keyboard case structure 102 while media slot 14d and other such accessible areas of keyboard assembly 14 remain uncovered since, for instance, right wall 102d1 and right ledge 102d2 do not fully extend all along baseplate-portion right side 102d4 to thereby provide accessible open area to media slot 14d, and left wall portion 102b1 and left ledge portion 102b2 do not fully extend all along baseplate-portion left side 102b4 to thereby provide accessible open area, while both left side portion (second side portion) 102b and right side portion (fourth side portion) 102d having such portions of baseplate-portion left side 102b4 and baseplate-portion right side 102d4, respectively, extending past left wall portion 102b1 and right wall 102d1, respectively, thereby additionally allowing for closure of conventional laptop 10 while keyboard assembly 14 is contained by keyboard case structure 102.

The display case structure 104 includes front side portion (first side portion) 104a with front wall portion 104a1; left side portion (second side portion) 104b, with left wall portion 104b1, left ledge portion 104b2 (see FIG. 8), and left channel 104b3 (see FIG. 8); rear side portion (third side portion) 104c with groove 104c1, channel 104c2, baseplate-portion right side 104c3, first engagement indent 104c4; right side portion (fourth side portion) 104d with right wall portion 104d1; and baseplate portion 104e with baseplate portion exterior surface 104e1. The display case structure 104 can be a single molded piece from a type of plastic or other moldable material or can be constructed from individual pieces such as for each of front side portion (first side portion) 104a, left side portion (second side portion) 104b, rear side portion (third side portion) 104c, right side portion (fourth side portion) 104d, and baseplate portion 104e.

Portions of front side portion (first side portion) 104a, left side portion (second side portion) 104b, and right side portion (fourth side portion) 104d are sized and shaped to receive top side portion (first side portion) 12a, left bevel portion (second side portion) 12b, and right bevel portion (fourth side portion) 12d, respectfully, of keyboard assembly 14 of conventional laptop 10 with some versions having a substantially snug fit so that one or more surfaces of display case structure 104 are substantially in contact with one or more surfaces of display assembly 12 as display assembly 12 is being contained by display case structure 104 while, for instance, left wall portion 104b1 and right wall portion 104d1 do not fully extend to rear side portion (third side portion) 104c to thereby provide accessible open area to portions of left bevel portion (second side portion) 12b and right bevel portion (fourth side portion) 12d to allow for closure of conventional laptop 10 while display assembly 12 is contained by display case structure 104. Implementations of display case structure 104 also can include all of features shown to be included with keyboard case structure 102 such as more ledges than left ledge portion 104b2 that extend from front wall portion 104a1 and right wall portion 104d1 to form additional channels to further engage with display assembly 12.

The hinge case structure 106 includes first engagement edge 106a (for engagement with groove 102c1 of rear side portion (third side portion) 102c of keyboard case structure 102), first engagement gutter 106b (for engagement with channel 102c2 of rear side portion (third side portion) 102c of keyboard case structure 102), panel-like portion 106c (for hinge area of conventional laptop 10, which includes rear side portion (second side portion) 14b), second engagement gutter 106d (for engagement with channel 104c2 of rear side portion (third side portion) 104c of display case structure 104), second engagement edge 106e (for engagement with groove 102c1 of rear side portion (third side portion) 102c of keyboard case structure 102), second engagement edge end 06f, second engagement gutter end 106g, panel-like portion end 106h, first engagement gutter end 106i, first engagement edge end 106j, first engagement edge tab 106k, and second engagement edge tab 106l. Other implementations can locate grooves and channels on hinge case structure 106 and can locate engagement gutters and engagement edges on keyboard case structure 102 and display case structure 104.

Figure 2:
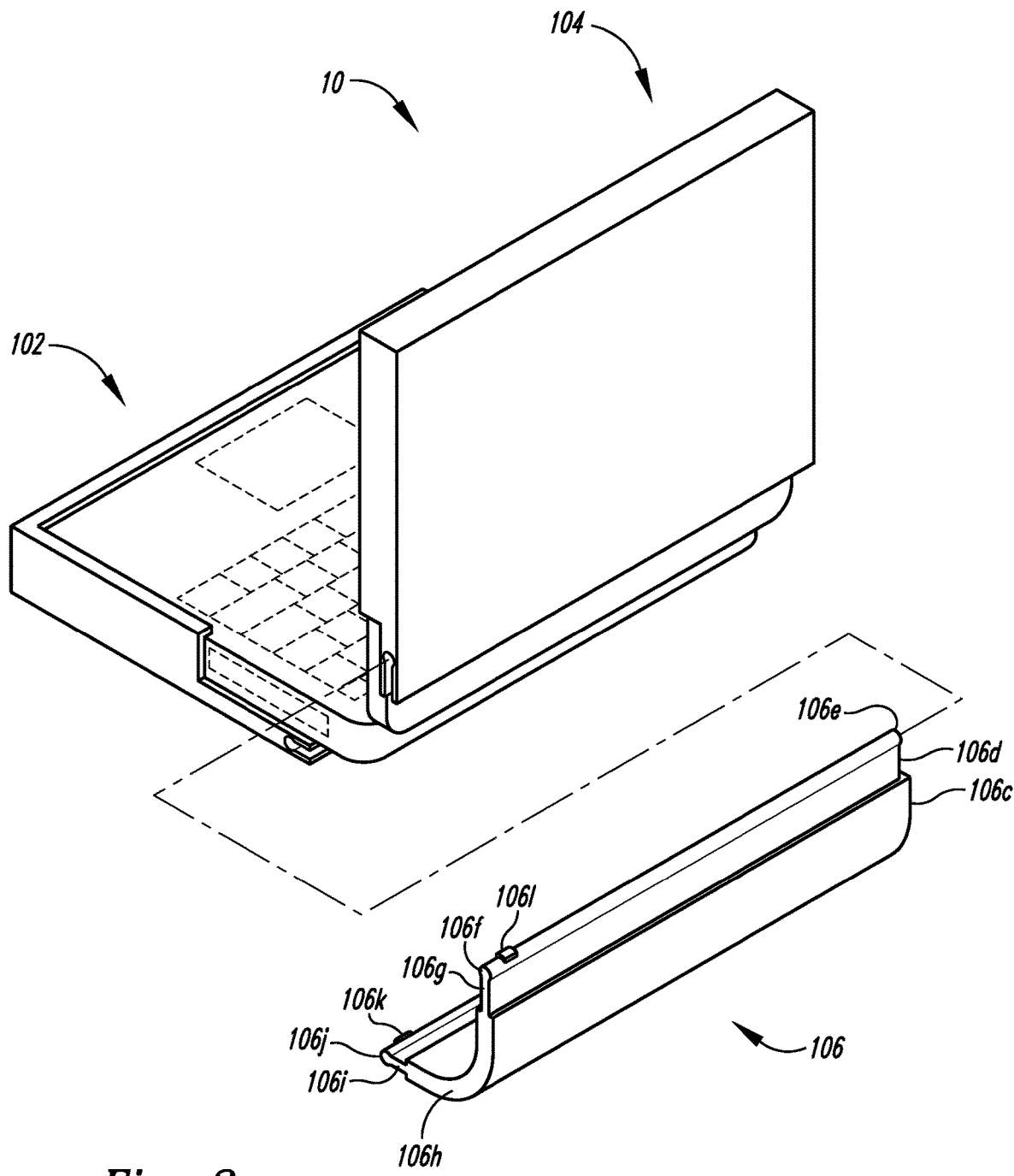
FIG. 2 is a rear perspective exploded view of the first computer laptop case implementation of FIG. 1 partially engaged with the conventional computer laptop.
Figure 3:
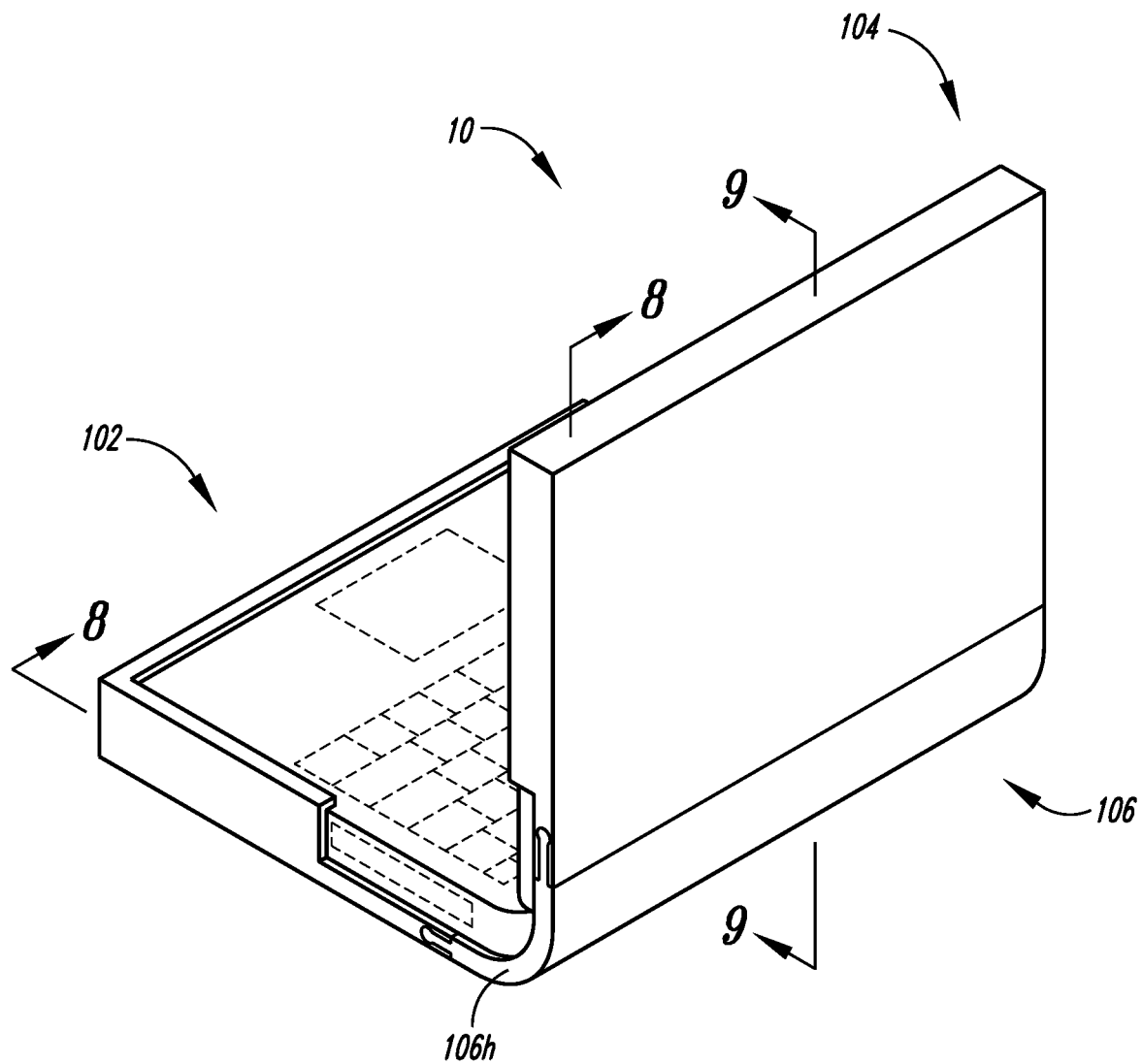
FIG. 3 is a rear perspective view of the first computer laptop case implementation of FIG. 1 fully engaged with the conventional computer laptop.
Figure 4:
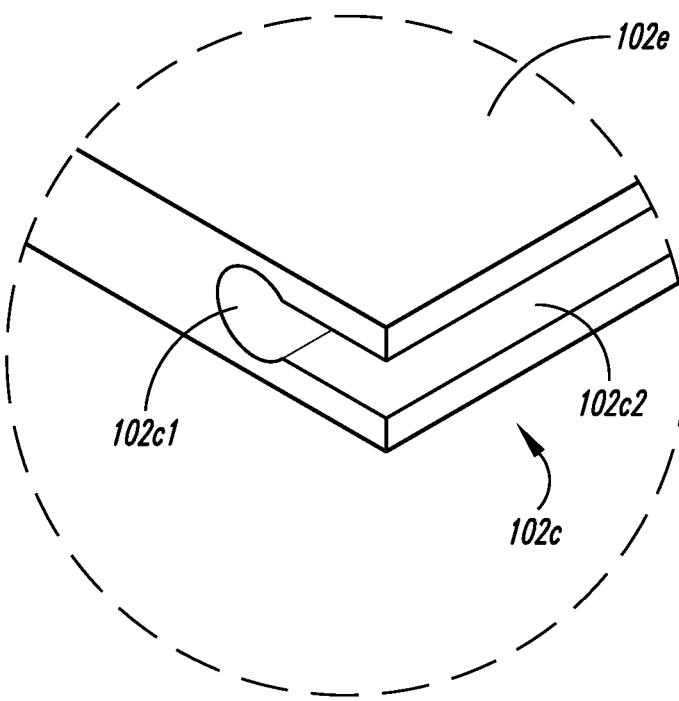
FIG. 4 is a rear enlarged perspective view of a portion of the display case assembly for a first laptop case implementation taken from within the "4"-circle of FIG. 1.
Figure 5:
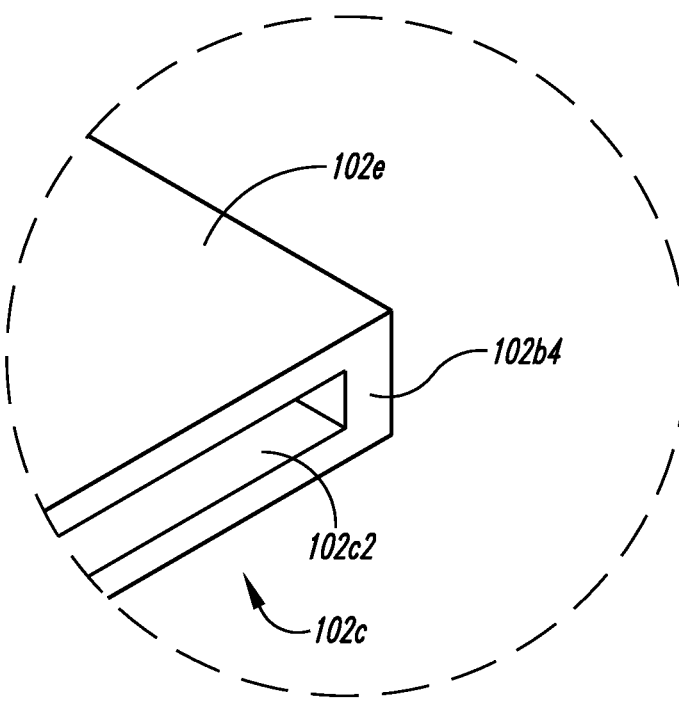
FIG. 5 is a rear enlarged perspective view of a portion of the display case assembly for a first laptop case implementation taken from within the "5"-circle of FIG. 1.
Figure 6:
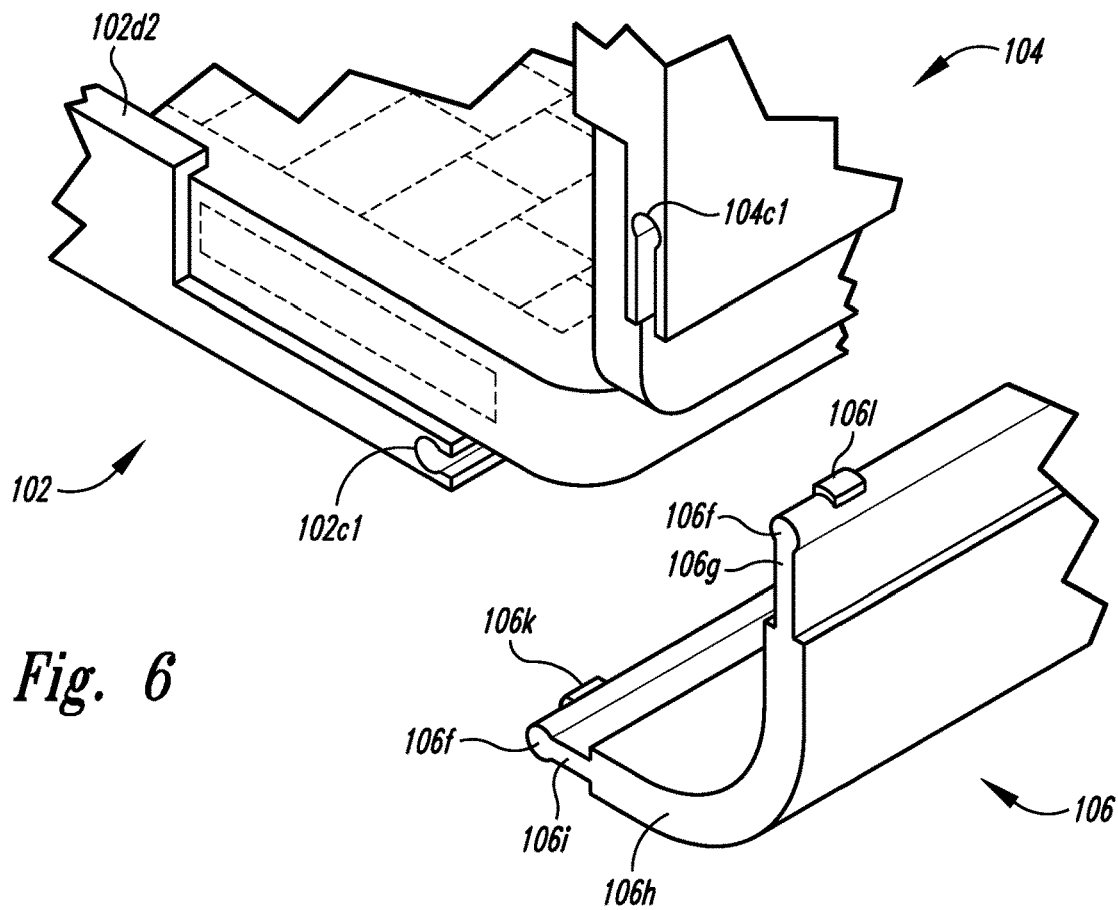
FIG. 6 is a rear perspective sectional view of a portion of the display case assembly for the first computer laptop case implementation of FIG. 1 partially engaged with the conventional computer laptop.
Figure 7:
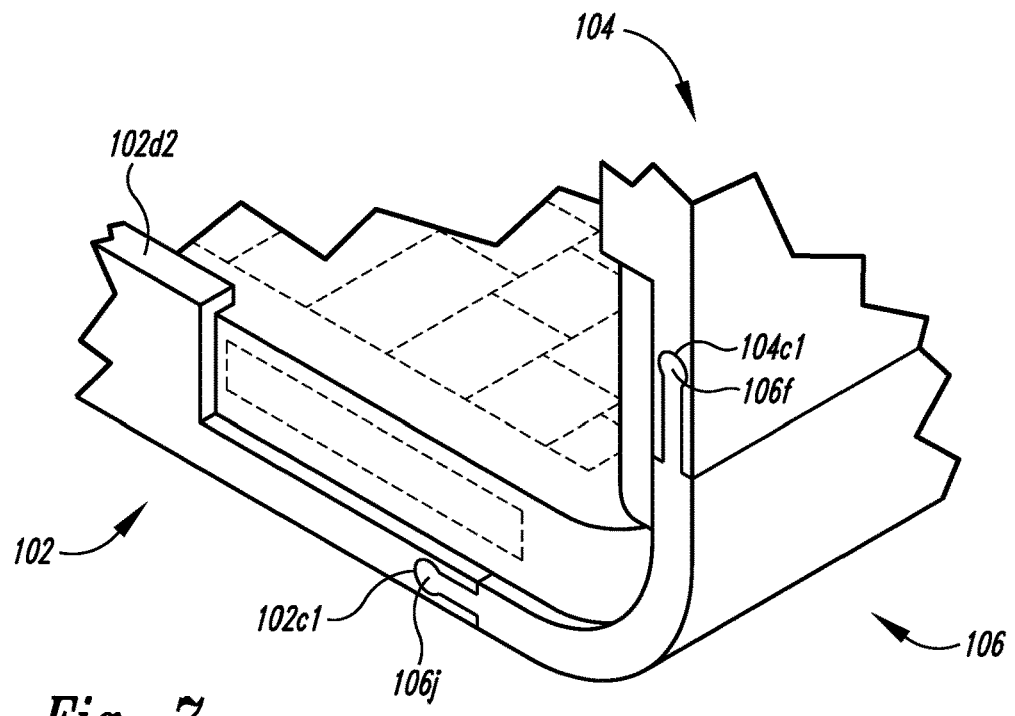
FIG. 7 is a rear perspective sectional view of a portion of the display case assembly for the first computer laptop case implementation of FIG. 1 fully engaged with the conventional computer laptop.
Figure 8:
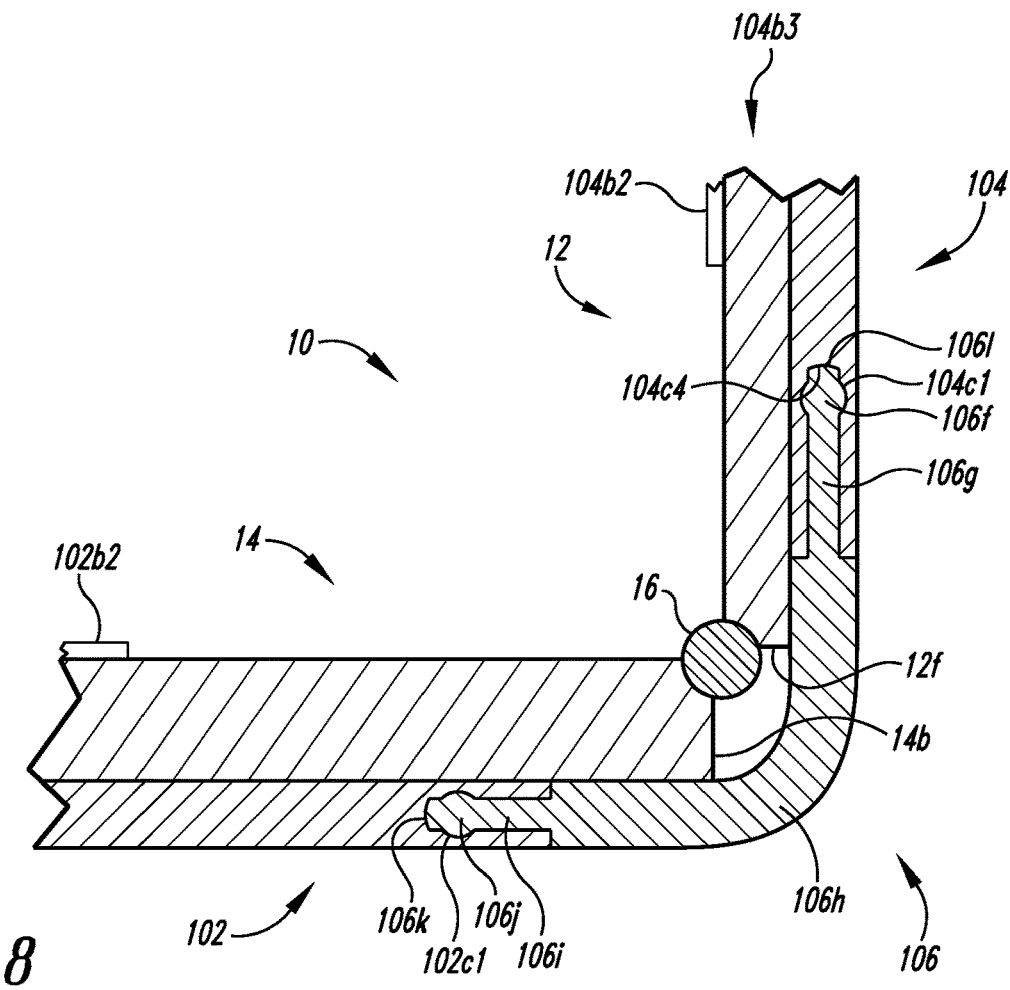
FIG. 8 is a cross-sectional side-elevational sectional view taken along the 8-8 cut-line of FIG. 3 of a portion of the display case assembly for the first computer laptop case implementation fully engaged with the conventional computer laptop.
Figure 9:
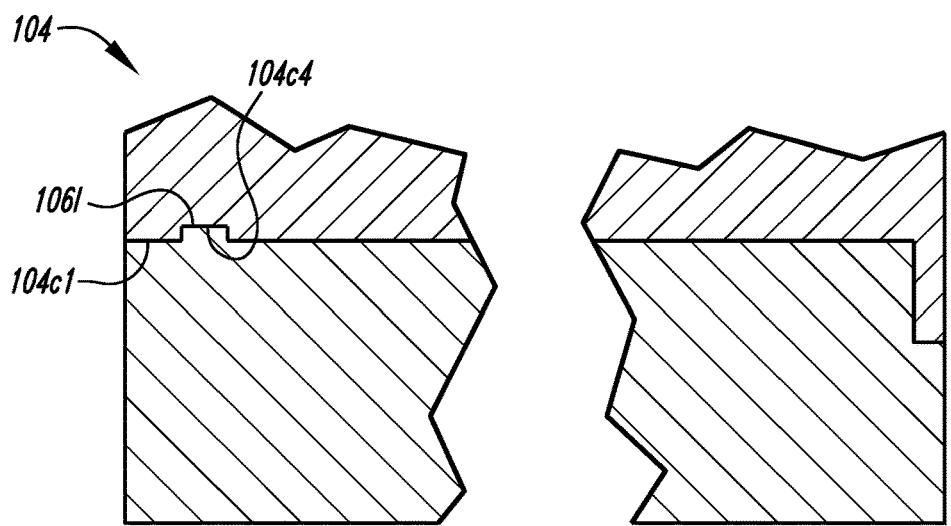
FIG. 9 is a cross-sectional side-elevational sectional view taken along the 9-9 cut-line of FIG. 3 of a portion of the display case assembly for the first computer laptop case implementation fully engaged with the conventional computer laptop.

Turning to FIGS. 2 and 6, keyboard case structure 102 and display case structure 104 are shown coupled to keyboard assembly 14 and display assembly 12, respectively, and with hinge case structure 106 to be engaged therewith and further so engaged as shown in FIGS. 3, 7-8 by sliding first engagement edge 106a and first engagement gutter 106b of hinge case structure 106 into groove 102c1 and channel 102c2 of rear side portion (third side portion) 102c, respectively, and by sliding second engagement gutter 106d and second engagement edge 106e of hinge case structure 106 into channel 104c2 and groove 104c1 of rear side portion (third side portion) 104c, respectively, which is shown in greater detail as a rear enlarged perspective view of a portion of keyboard case structure 102 in FIG. 4 as taken from within the "4"-circle of FIG. 1 and in FIG. 5 as taken from within the "5"-circle of FIG. 1. As hinge case structure 106 is slid into keyboard case structure 102 and display case structure 104 both keyboard case structure 102 and keyboard case structure 102 engages with indents found within groove 102c1 and groove 104c1, respectively, such as shown in FIG. 9 depicting first engagement edge tab 106k of hinge case structure 106 engaging with first engagement indent 104c4 of rear side portion (third side portion) 104c of display case structure 104.

Figure 10:
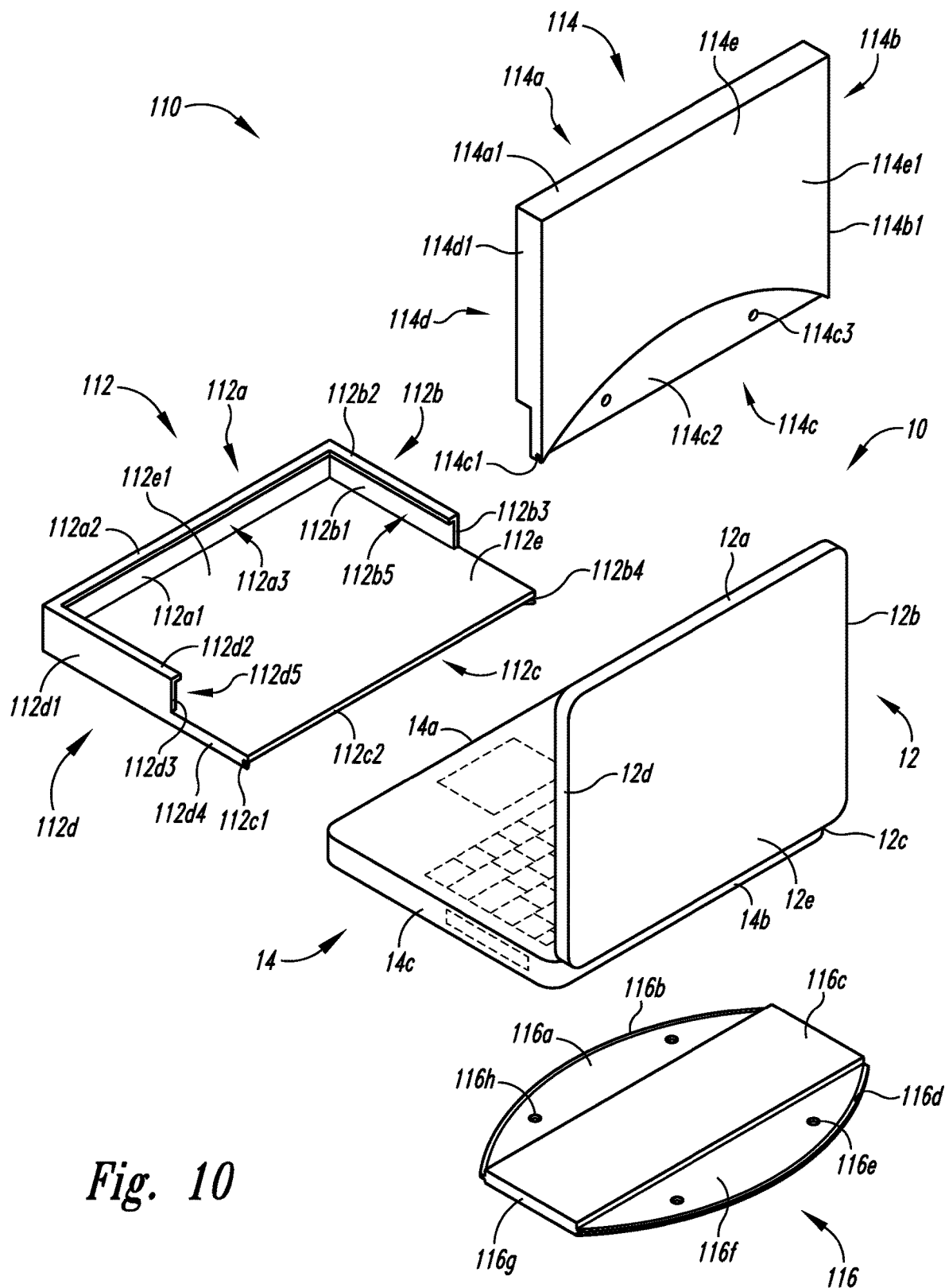
FIG. 10 is a rear perspective exploded view of a second computer laptop case implementation along with the conventional computer laptop.

Turning to FIG. 10, comprising three sections, case assembly 110 includes keyboard case structure 112, display case structure 114, and hinge case structure 116. The keyboard case structure 112 includes front side portion (first side portion) 112a with front wall portion 112a1 and front ledge portion 112a2 forming front channel portion 112a3; left side portion (second side portion) 112b with left wall portion 112b1, left ledge portion 112b2, and left end portion 112b3 forming left channel 112b5 and also with baseplate-portion right side 112b4; rear side portion (third side portion) 112c with groove 112c1 and rear edge portion 112c2; right side portion (fourth side portion) 112d with right wall 112d1, right ledge 112d2, and right end 112d3 forming right channel 112d5 and also with baseplate-portion right side 112d4; and baseplate portion 112e with baseplate portion interior surface 112e1. The keyboard case structure 112 can be a single molded piece from a type of plastic or other moldable material or can be constructed from individual pieces such as for each of front side portion (first side portion) 112a, left side portion (second side portion) 112b, rear side portion (third side portion) 112c, right side portion (fourth side portion) 112d, and baseplate portion 112e. The front channel portion 112a3, left channel 112b5, and right channel 112d5 are sized and shaped to receive front side portion (first side portion) 14a, left side portion (not shown), and right side portion (third side portion) 14c, respectfully, of keyboard assembly 14 of conventional laptop 10 with some versions having a substantially snug fit so that one or more surfaces of keyboard case structure 112 are substantially in contact with one or more surfaces of keyboard assembly 14 without interfering with upper surface 14e including touchpad 14f and keyboard 14g as keyboard assembly 14 is being contained by keyboard case structure 112 while media slot 14d and other such accessible areas of keyboard assembly 14 remain uncovered since, for instance, right wall 112d1 and right ledge 112d2 do not fully extend all along baseplate-portion right side 112d4 to thereby provide accessible open area to media slot 14d, and left wall portion 112b1 and left ledge portion 112b2 do not fully extend all along baseplate-portion right side 112b4 to thereby provide accessible open area, while both left side portion (second side portion) 112b and right side portion (fourth side portion) 112d having such portions of baseplate-portion right side 112b4 and baseplate-portion right side 112d4, respectively, extending past left wall portion 112b1 and right wall 112d1, respectively, thereby additionally allowing for closure of conventional laptop 10 while keyboard assembly 14 is contained by keyboard case structure 112.

The display case structure 114 includes front side portion (first side portion) 114a with front wall portion 114a1; left side portion (second side portion) 114b, with left wall portion 114b1; rear side portion (third side portion) 114c with groove 114c1, recessed area 114c2, aperture 114c3; right side portion (fourth side portion) 114d with right wall portion 114d1; and baseplate portion 114e with baseplate portion exterior surface 114e1. The display case structure 114 can be a single molded piece from a type of plastic or other moldable material or can be constructed from individual pieces such as for each of front side portion (first side portion) 114a, left side portion (second side portion) 114b, rear side portion (third side portion) 114c, right side portion (fourth side portion) 114d, and baseplate portion 114e. Portions of front side portion (first side portion) 114a, left side portion (second side portion) 114b, and right side portion (fourth side portion) 114d are sized and shaped to receive top side portion (first side portion) 12a, left bevel portion (second side portion) 12b, and right bevel portion (fourth side portion) 12d, respectfully, of keyboard assembly 14 of conventional laptop 10 with some versions having a substantially snug fit so that one or more surfaces of display case structure 114 are substantially in contact with one or more surfaces of display assembly 12 as display assembly 12 is being contained by display case structure 114 while, for instance, left wall portion 114b1 and right wall portion 114d1 do not fully extend to rear side portion (third side portion) 114c to thereby provide accessible open area to portions of left bevel portion (second side portion) 12b and right bevel portion (fourth side portion) 12d to allow for closure of conventional laptop 10 while display assembly 12 is contained by display case structure 114.

Figure 11:
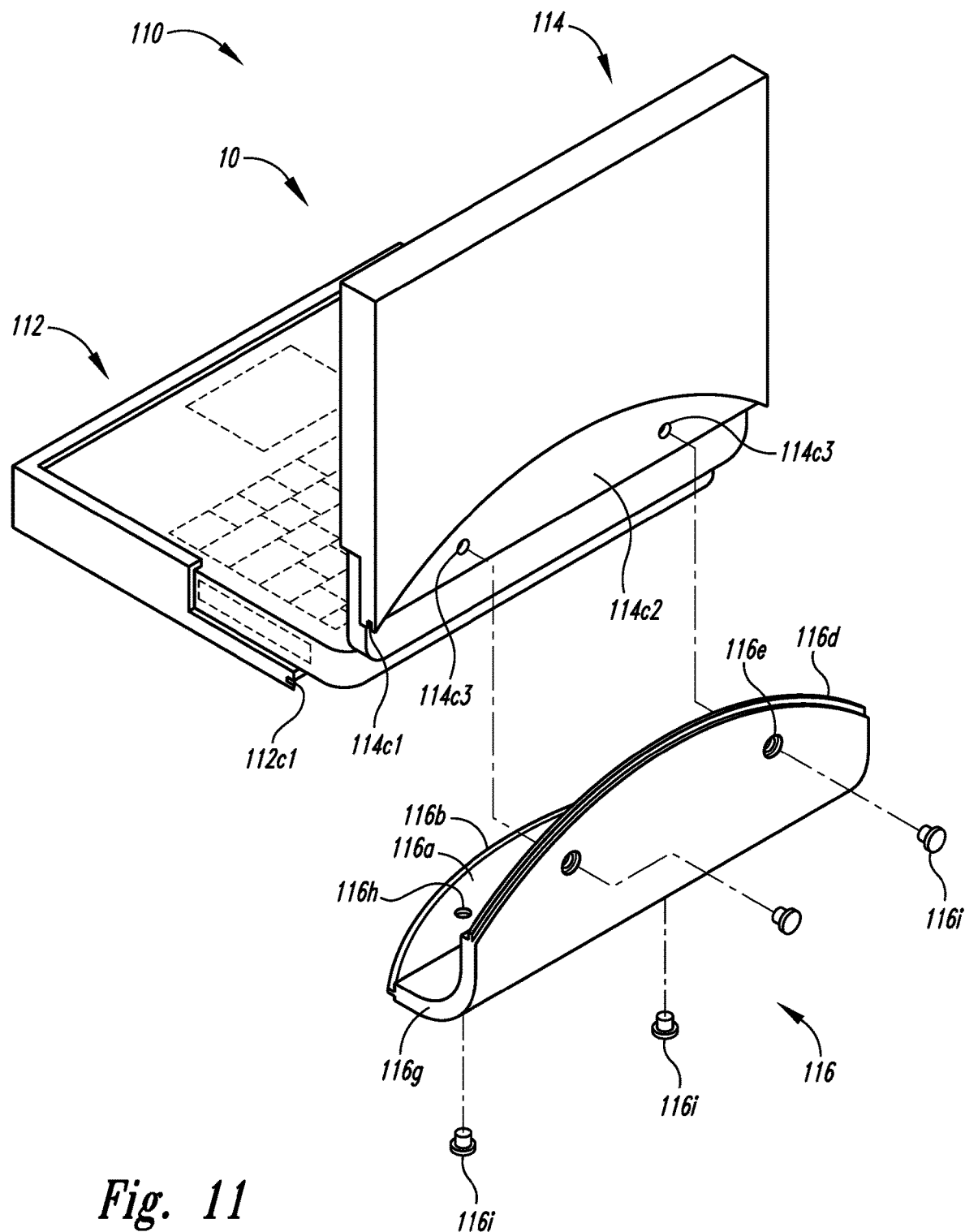
FIG. 11 is a rear perspective exploded view of the second computer laptop case implementation of FIG. 10 partially engaged with the conventional computer laptop.

The hinge case structure 116 includes first engagement flap 116a (for engagement with recessed area (not shown) of rear side portion (third side portion) 112c of keyboard case structure 112), first engagement edge 116b (for engagement with groove 112c1 of rear side portion (third side portion) 112c of keyboard case structure 112), panel-like portion 116c (for hinge area of conventional laptop 10, which includes rear side portion (second side portion) 14b), second engagement edge 116d (for engagement with groove 114c1 of rear side portion (third side portion) 114c of display case structure 114), aperture 116e (for engagement with aperture 114c3 of rear side portion (third side portion) 114c of display case structure 114), second engagement flap 116f (for engagement with recessed area 114c2 of rear side portion (third side portion) 114c of display case structure 114), panel-like portion end 116g, aperture 116h (for engagement with aperture (not shown) rear side portion (third side portion) 112c of keyboard case structure 112), fasteners 116i (shown in FIG. 11 for engagement with apertures (such as aperture 116e and aperture 116h) of hinge case structure 116 and for engagement with apertures (such as those apertures not shown of rear side portion (third side portion) 112c and aperture 114c3 of display case structure 114).

Figure 13:
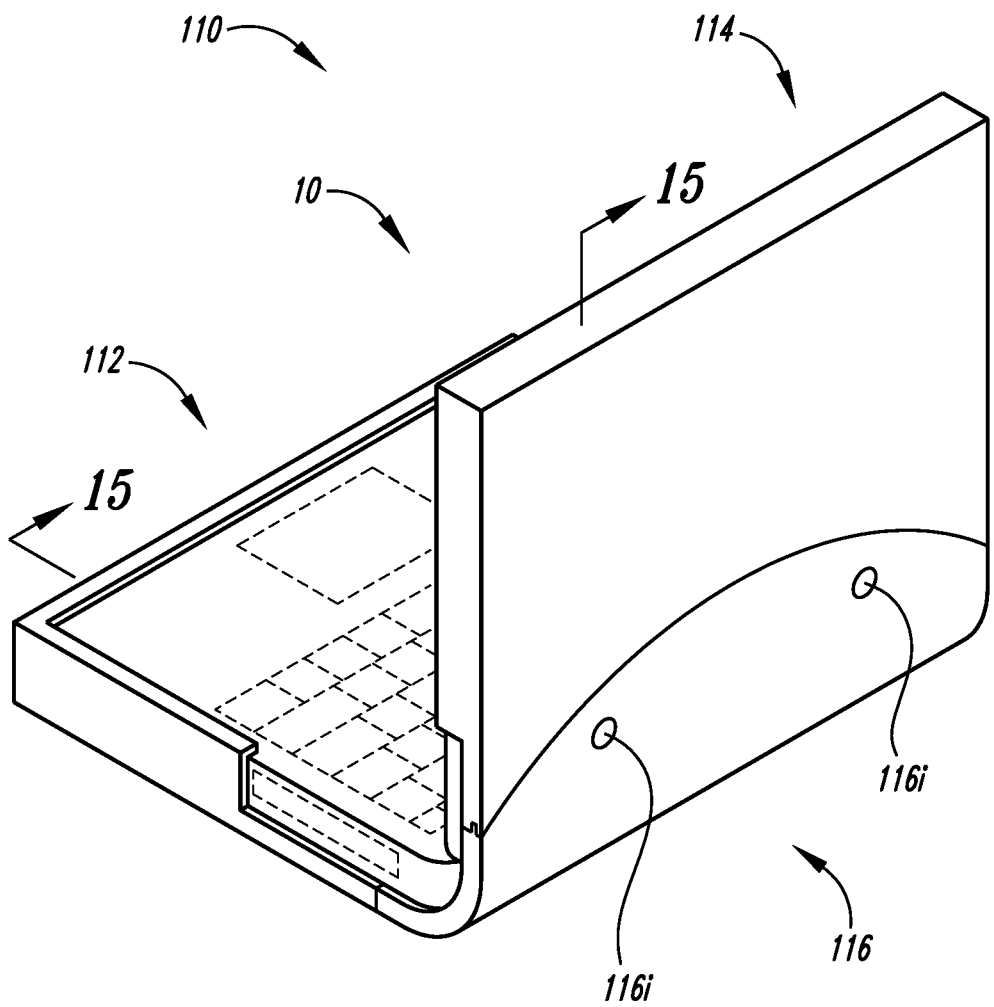
FIG. 13 is a rear perspective view of the second computer laptop case implementation of FIG. 10 fully engaged with the conventional computer laptop.
Figure 14:
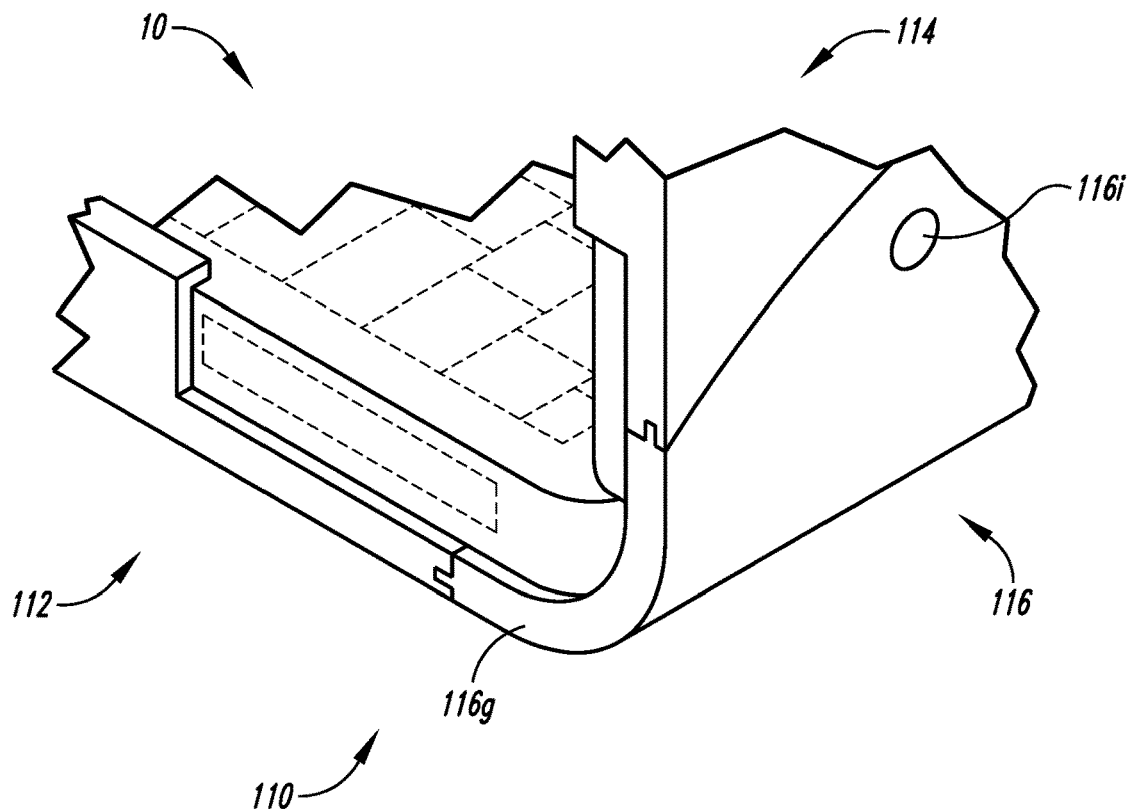
FIG. 14 is a rear perspective sectional view of the second computer laptop case implementation of FIG. 10 fully engaged with the conventional computer laptop.
Figure 15:
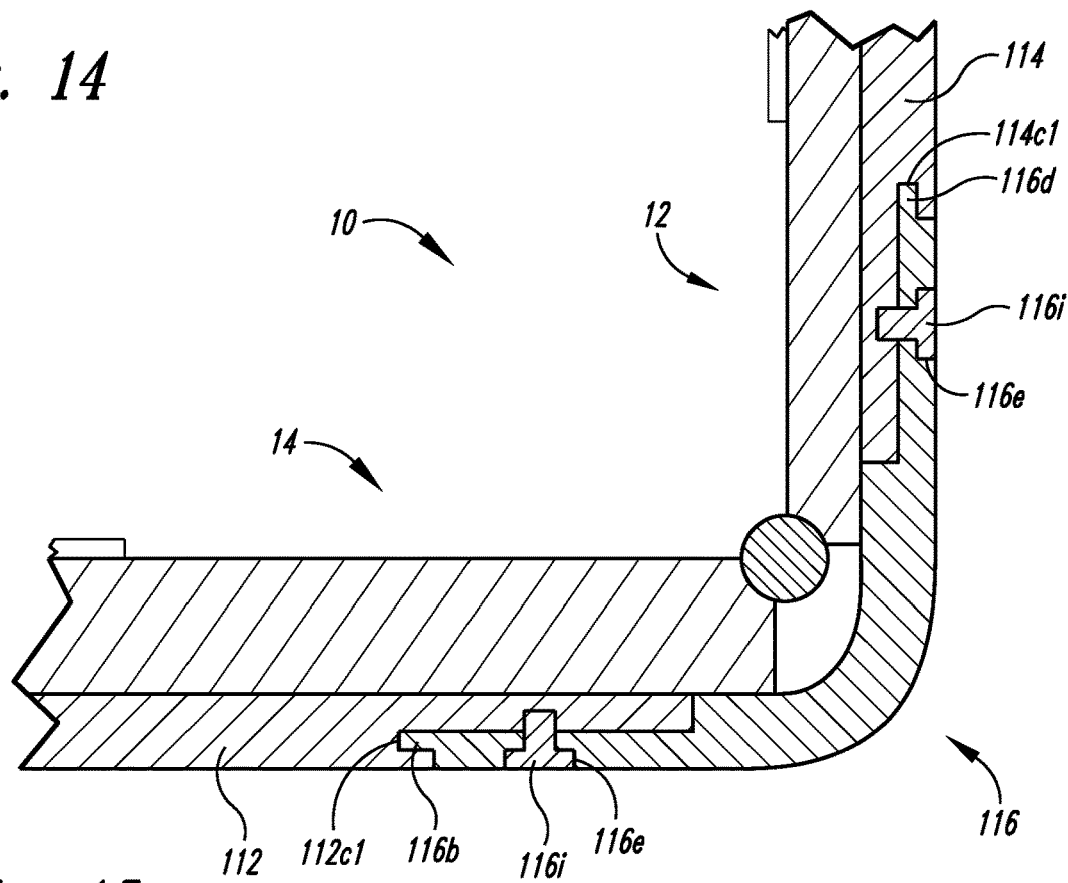
FIG. 15 is a cross-sectional view taken along the 15-15 cutline of FIG. 13 of a sectional view of the second computer laptop case implementation of FIG. 10 fully engaged with the conventional computer laptop.

Turning to FIGS. 11-12, keyboard case structure 112 and display case structure 114 are shown coupled to keyboard assembly 14 and display assembly 12, respectively, and with hinge case structure 116 to be engaged therewith and further so engaged as shown in FIGS. 13-15 by sliding first engagement edge 116b and second engagement edge 116d of hinge case structure 116 into groove 112c1 of rear side portion (third side portion) 112c of keyboard case structure 112 and groove 114c1 of rear side portion (third side portion) 114c of display case structure 114, respectively, and by inserting fasteners 116i through apertures of hinge case structure 116 such as aperture 116h and fasteners 116i to engage with apertures of keyboard case structure 112 and display case structure 114 such as aperture 114c3 of display case structure 114.

Figure 16:
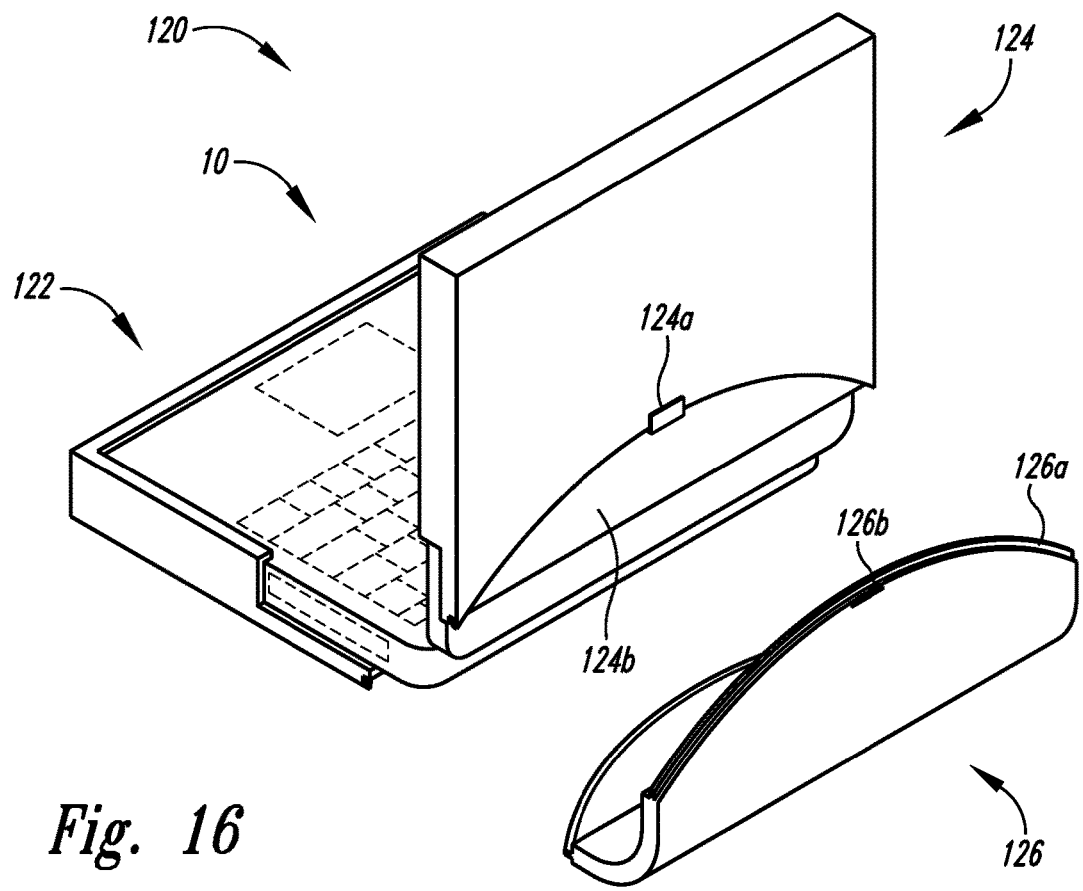
FIG. 16 is a rear perspective exploded view of a third computer laptop case implementation partially engaged with the conventional computer laptop.
Figure 17:
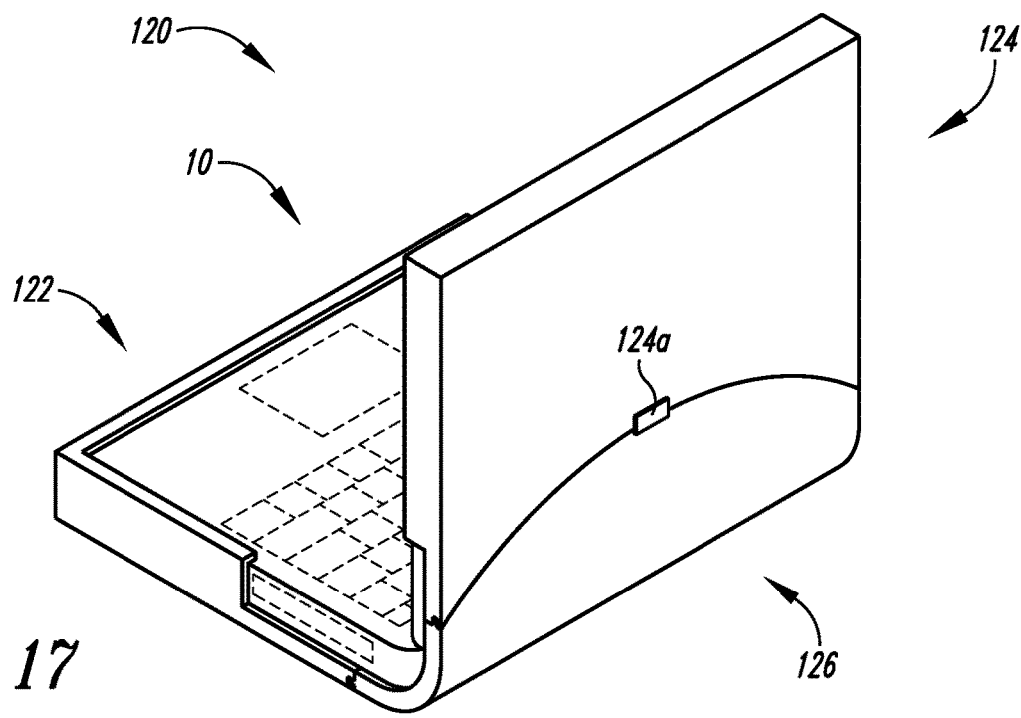
FIG. 17 is a rear perspective exploded view of a third computer laptop case implementation fully engaged with the conventional computer laptop.

Turning to FIGS. 16-17, shown in rear perspective view is conventional laptop 10 having display assembly 12 and keyboard assembly 14 engaged with keyboard case structure 122 and display case structure 124 of case assembly 120, respectively whereby keyboard case structure 122 and display case structure 124 are positioned for engaging with hinge case structure 126 with, for instance, first engagement edge 126a engaging with display case structure 124 as explained above for other of the display case structure 104 and display case structure 114, and with an alternative further engagement of first engagement indent 126b of hinge case structure 126 to engage with engagement latch portion 124a of display case structure 124 to secure engagement therewith. The display case structure 124 can also include an engagement latch portion with corresponding engagement indent on hinge case structure 126. Other implementations can locate engagement latch portion on hinge case structure 126 and locate engagement indent on display case structure 124 or keyboard case structure 122.

Figure 18:
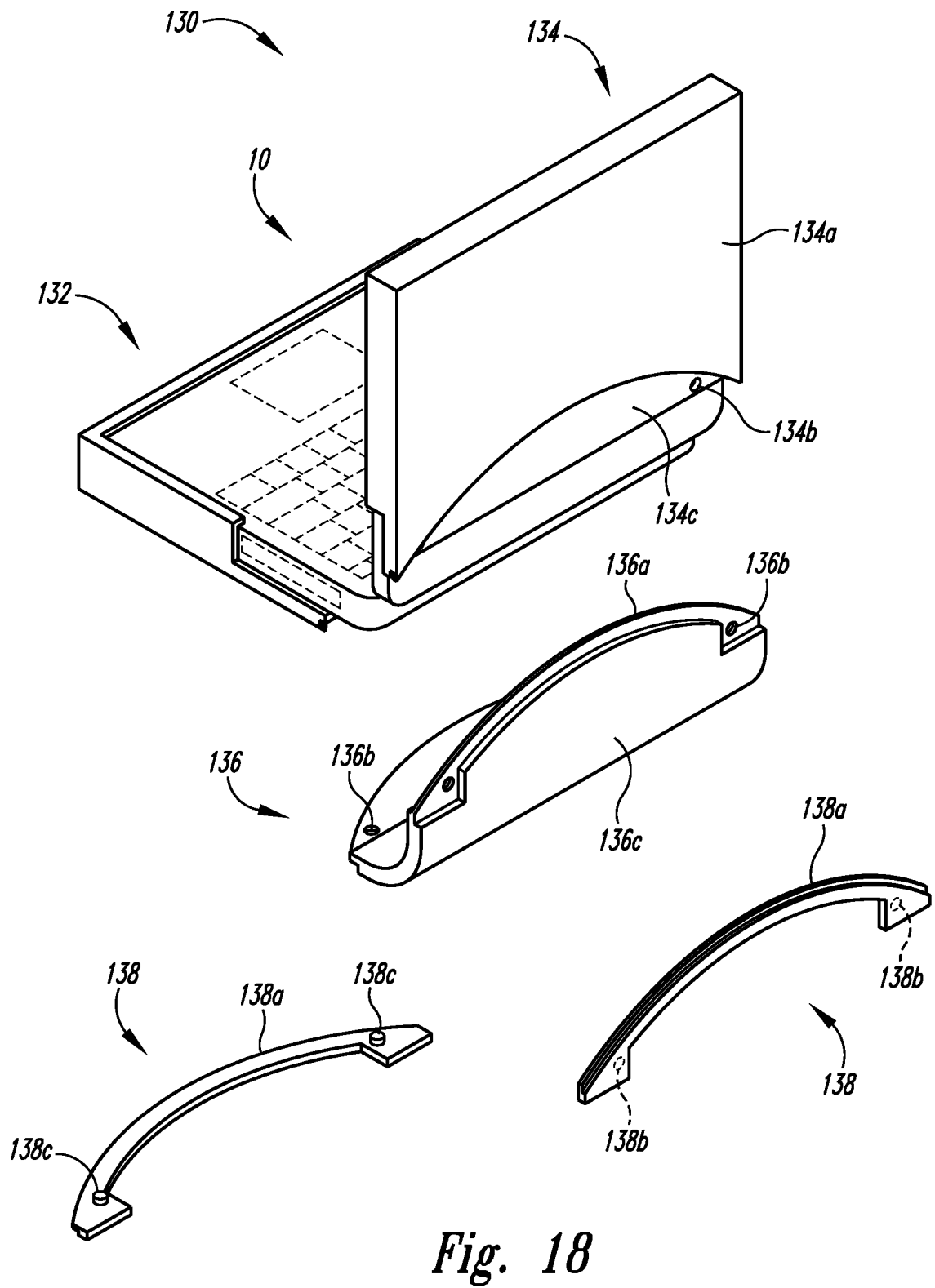
FIG. 18 is a rear perspective exploded view of a fourth computer laptop case implementation partially engaged with the conventional computer laptop.
Figure 19:
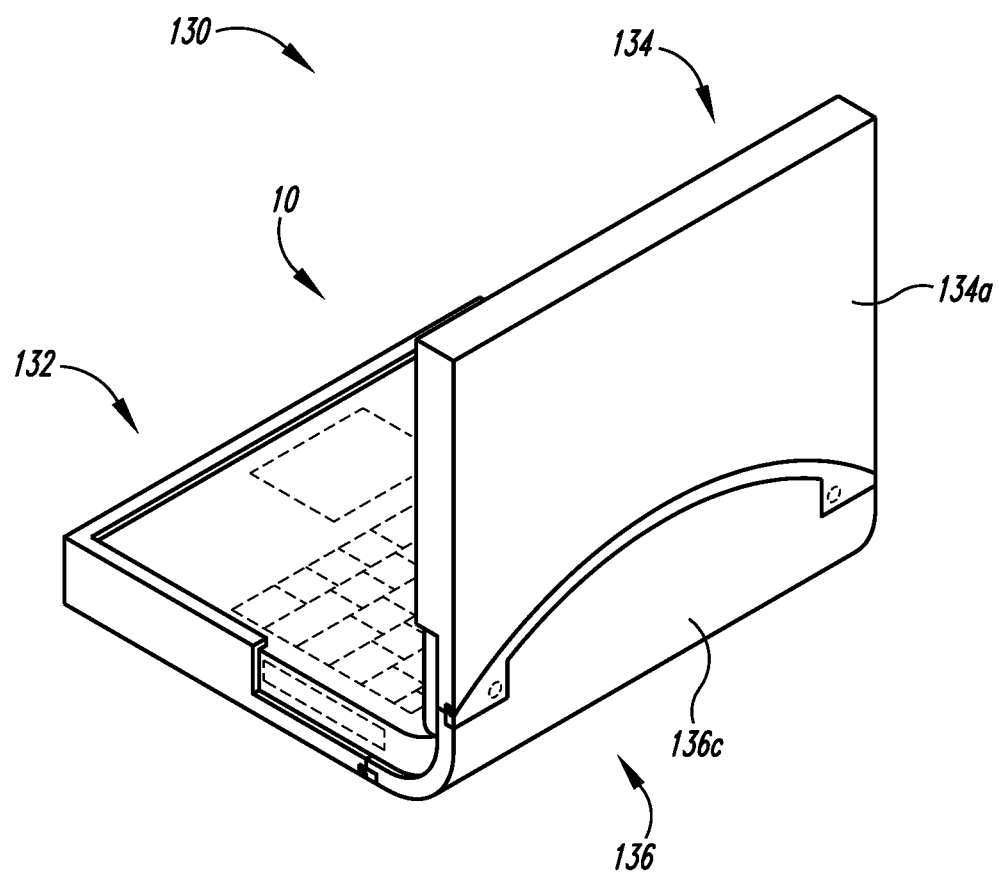
FIG. 19 is a rear perspective exploded view of a fourth computer laptop case implementation fully engaged with the conventional computer laptop.

Turning to FIGS. 18-19, shown in rear perspective view is conventional laptop 10 having display assembly 12 and keyboard assembly 14 engaged with keyboard case structure 132 and display case structure 134 of case assembly 130, respectively whereby keyboard case structure 132 and display case structure 134 are positioned for engaging with hinge case structure 136 with, for instance, first engagement edge 136a engaging with display case structure 134 as explained above for other of the display case structure 104 and display case structure 114, and with an alternative further alignment of apertures such as aperture 136b of hinge case structure 136 with aperture 134b of display case structure 134 and with panel-like portion 136c of hinge case structure 136 being received into recessed area 134c of display case structure 134 and with brackets 138 being used to further secure with engagement edge 138a spanning between protrusion positions 138b and protrusions 138c of brackets 138 with protrusions 138c being inserted through apertures such as aperture 136b of hinge case structure 136 and aperture 134b of display case structure 134 so aligned; likewise engagement of hinge case structure 136 with display case structure 134 is had with a second of brackets 138 also shown in FIG. 18 and with FIG. 19 depicting keyboard case structure 132 and display case structure 134 so engaged with hinge case structure 136.

Figure 20:
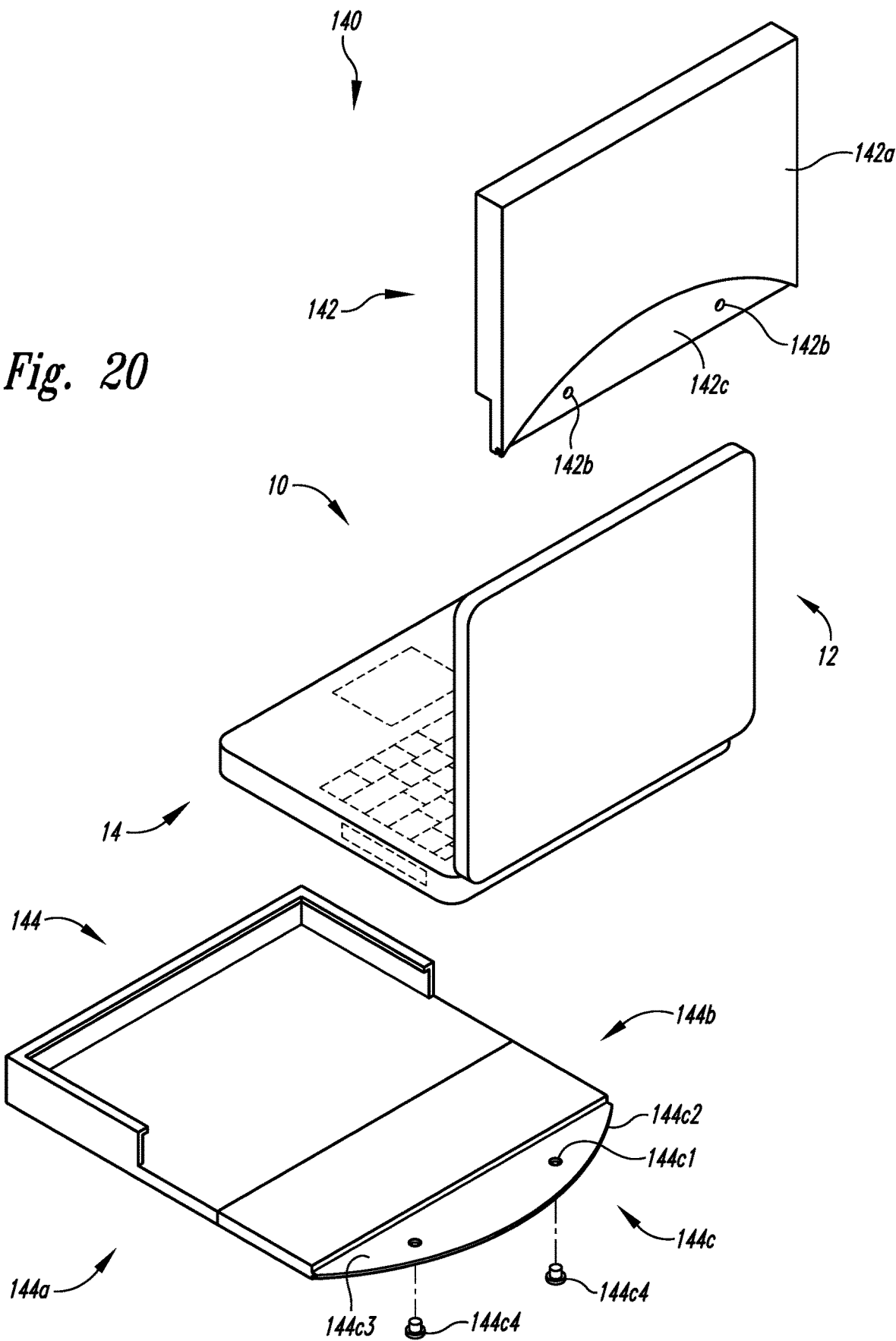
FIG. 20 is a rear perspective exploded view of a fifth computer laptop case implementation along with the conventional computer laptop.
Figure 21:
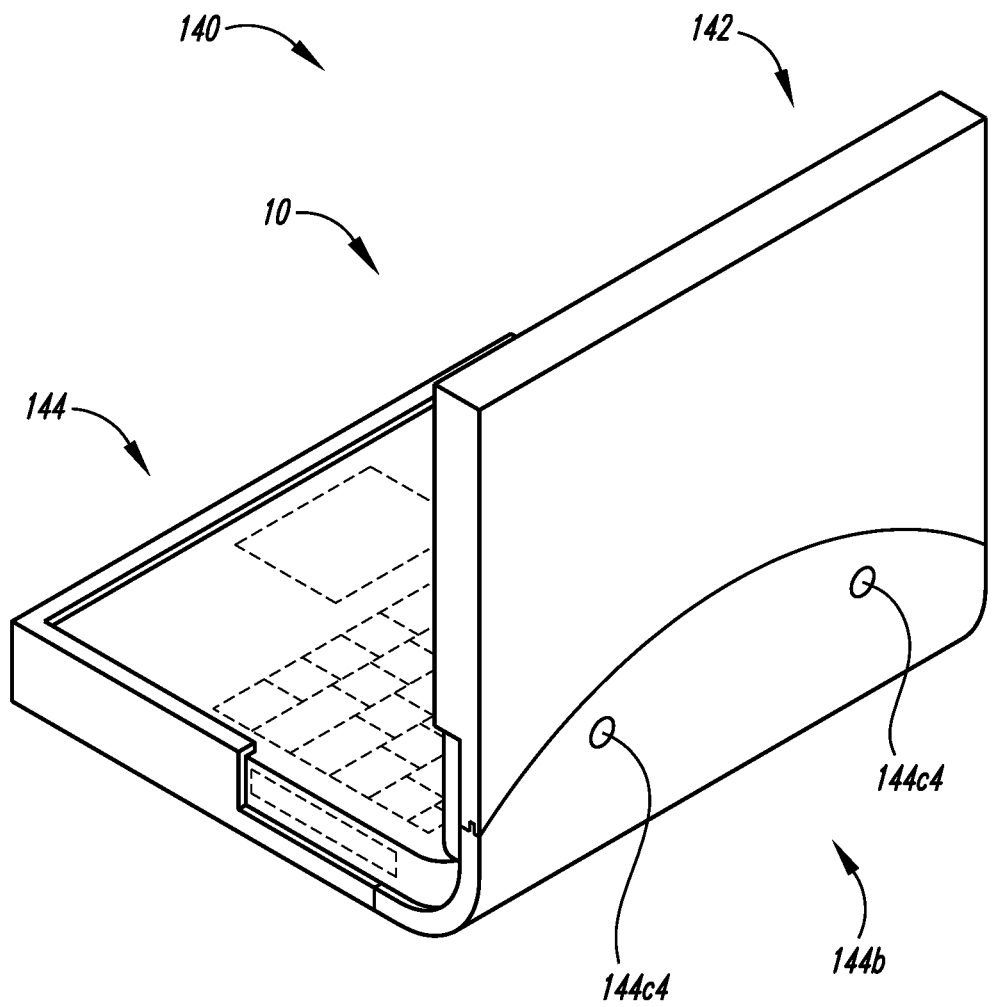
FIG. 21 is a rear perspective view of a fifth computer laptop case implementation fully engaged with the conventional computer laptop.

Turning to FIGS. 20 and 21, an alternative version of that shown in FIGS. 11-15 is depicted as case assembly 140 including display case structure 142 with baseplate portion 142a, apertures 142b, and recessed area 142c and keyboard-hinge case structure 144 as one-piece with keyboard case portion 144a integral with hinge case portion 144b, which further includes engagement structure 144c with aperture 144c1, engagement edge 144c2, engagement flap 144c3, and fasteners 144c4, which engages with display case structure 142 as described above and shown in FIG. 21. In other implementations a display case structure can be integral with a hinge case structure with a keyboard case structure being separate to detachably engage with the hinge case structure.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A case for an electronic laptop computing device having a display assembly and a keyboard assembly, the case comprising:
   (I) a keyboard case structure including but not limited to:
      (A) a baseplate portion including a recessed area and one or more apertures,
      (B) a first side portion,
      (C) a first wall extending from the first side portion,
      (D) a second side portion,
      (E) a second wall extending from the second side portion,
      (F) a fourth side portion,
      (G) a fourth wall extending from the fourth side portion, and
      (H) a third side portion,
      wherein the first wall, the second wall and the fourth wall being sized and shaped to detachably engage with the keyboard assembly;
   (II) a display case structure including
      (A) a baseplate portion including a recessed area and one or more apertures,
      (B) a first side portion,
      (C) a first wall extending from the first side portion,
      (D) a second side portion,
      (E) a second wall extending from the second side portion,
      (F) a fourth side portion,
      (G) a fourth wall extending from the fourth side portion, and
      (H) a third side portion,
      wherein the first wall, the second wall and the fourth wall being sized and shaped to detachably engage with the display assembly;
   (III) a hinge case structure including
      (A) a panel-like portion,
      (B) a first engagement flap extending from the panel-like portion, the first engagement flap being sized and shaped to engage with the recessed area of the baseplate portion of the keyboard case structure, and
      (C) a second engagement flap including one or more apertures, the second engagement flap extending from the panel-like portion, the second engagement flap being sized and shaped to engage with the recessed area of the baseplate portion of the display case structure,
      wherein the panel-like portion being sized and shaped to allow the first engagement flap to engage with the recessed area of the baseplate portion of the keyboard case structure and to allow the second engagement flap to engage with the recessed area of the baseplate portion of the display case structure,
      wherein
         (A) the first engagement flap includes one or more apertures,
         (B) the second engagement flap includes one or more apertures,
         (C) the baseplate portion of the keyboard case includes one or more apertures, and
         (D) the baseplate portion of the display case includes one or more apertures,
      wherein
         the panel-like portion being sized and shaped to allow for positioning of the hinge case structure with respect to the keyboard case structure and with respect to the display case structure to allow for alignment of the one or more apertures of the baseplate portion of the keyboard case with the one or more apertures of first engagement flap and to allow for alignment of the one or more apertures of the baseplate portion of the display case with the one or more apertures of the second engagement flap;
   (IV) one or more first fasteners being sized and shaped to be received by the one or more apertures of the baseplate portion of the keyboard case structure and the one or more apertures of the first engagement flap; and
   (V) one or more second fasteners being sized and shaped to be received by the one or more apertures of the baseplate portion of the display case structure and the one or more apertures of the second engagement flap.

2. The case of claim 1 wherein the one or more first and second fasteners are one or more screws.

3. The case of claim 1 wherein the one or more first and second fasteners are one or more pegs.

4. The case of claim 1 wherein the one or more first and second fasteners are one or more bolts.

5. The case of claim 1 wherein the one or more first and second fasteners are one or more clips.

6. The case of claim 1 further including one or more ledges extending from the first wall, the second wall and the fourth wall of the keyboard case structure and one or more ledges extending from the first wall, the second wall, and the fourth wall of the display case structure.

7. The case of claim 1 wherein the first and fourth walls of the keyboard case structure extend less than entirely along the first and fourth side portions of the keyboard case structure and the first and fourth walls of the display case structure extend less than entirely along the first and fourth side portions of the display case structure.

8. The case of claim 1 wherein the keyboard case structure is of a first one-piece molded construction, the display case structure is of a second one-piece molded construction and the hinge case structure is of a third one-piece molded construction.

9. The case of claim 1 wherein the second fasteners are selected from a list including a plurality of screws, a plurality of pegs, a plurality of bolts, and a plurality of clips.

10. The case of claim 1 further including one or more ledges extending from the first wall, the second wall and the fourth wall of the keyboard case structure.

11. The case of claim 1 wherein the first and fourth walls of the keyboard case structure extend less than entirely along the first and fourth side portions of the keyboard case structure.

12. The case of claim 1 further including one or more ledges extending from the one or more walls of the keyboard case structure.

13. The case of claim 1 wherein the one or more walls of the keyboard case structure extend less than entirely along the first and fourth side portions of the keyboard case structure.

14. The case of claim 1 wherein the keyboard case structure is of a one-piece molded construction and the hinge case structure is of a one-piece molded construction.

15. The case of claim 1 wherein the second fasteners are selected from a list including a plurality of screws, a plurality of pegs, a plurality of bolts, and a plurality of clips.

16. The case of claim 1 further including one or more ledges extending from the one or more walls of the display case structure.

17. The case of claim 1 wherein the one or more walls of the display case structure extend less than entirely along the first and fourth side portions of the display case structure.

18. The case of claim 1 wherein the display case structure is of a one-piece molded construction and the hinge case structure is of a one-piece molded construction.

19. A case for an electronic laptop computing device having a keyboard assembly, the case comprising:
(I) a keyboard case structure including but not limited to:
 (A) a baseplate portion including a recessed area and one or more apertures,
 (B) a first side portion,
 (C) a first wall extending from the first side portion,
 (D) a second side portion,
 (E) a second wall extending from the second side portion,
 (F) a fourth side portion,
 (G) a fourth wall extending from the fourth side portion, and
 (H) a third side portion,
 wherein the first wall, the second wall and the fourth wall being sized and shaped to detachably engage with the keyboard assembly;
(II) a hinge case structure including
 (A) a panel-like portion,
 (B) a first engagement flap extending from the panel-like portion, the first engagement flap being sized and shaped to engage with the recessed area of the baseplate portion of the keyboard case structure, and
 wherein the panel-like portion being sized and shaped to allow the first engagement flap to engage with the recessed area of the baseplate portion of the keyboard case structure,
 wherein
 (A) the first engagement flap includes one or more apertures,
 (B) the baseplate portion of the keyboard case includes one or more apertures, and
 wherein
 the panel-like portion being sized and shaped to allow for positioning of the hinge case structure with respect to the keyboard case structure to allow for alignment of the one or more apertures of the baseplate portion of the keyboard case with the one or more apertures of first engagement flap; and
(III) one or more first fasteners being sized and shaped to be received by the one or more apertures of the baseplate portion of the keyboard case structure and the one or more apertures of the first engagement flap.

20. A case for an electronic laptop computing device having a display assembly, the case comprising:
(I) a display case structure including
 (A) a baseplate portion including a recessed area and one or more apertures,
 (B) a first side portion,
 (C) a first wall extending from the first side portion,
 (D) a second side portion,
 (E) a second wall extending from the second side portion,
 (F) a fourth side portion,
 (G) a fourth wall extending from the fourth side portion, and
 (H) a third side portion,
 wherein the first wall, the second wall and the fourth wall being sized and shaped to detachably engage with the display assembly;
(II) a hinge case structure including
 (A) a panel-like portion, and
 (B) a second engagement flap including one or more apertures, the second engagement flap extending from the panel-like portion, the second engagement flap being sized and shaped to engage with the recessed area of the baseplate portion of the display case structure,
 wherein the panel-like portion being sized and shaped to allow the second engagement flap to engage with the recessed area of the baseplate portion of the display case structure,
 wherein
 (A) the second engagement flap includes one or more apertures, and
 (B) the baseplate portion of the display case includes one or more apertures,
 wherein the panel-like portion being sized and shaped to allow for positioning of the hinge case structure with respect to the display case structure to allow for alignment of the one or more apertures of the baseplate portion of the display case with the one or more apertures of the second engagement flap; and (III) one or more second fasteners being sized and shaped to be received by the one or more apertures of the baseplate portion of the display case structure and the one or more apertures of the second engagement flap.

* * * * *